United States Patent Office 3,184,315
Patented May 18, 1965

3,184,315
MANUFACTURE OF CHOCOLATE
FLAVORED CONFECTIONS
Henry N. Wolf, Philadelphia, Pa., assignor of one-half to
Dalris Company, Inc., Monmouth Junction, N.J.
No Drawing. Filed June 12, 1961, Ser. No. 116,261
4 Claims. (Cl. 99—23)

The purpose of the invention is to produce an improved chocolate flavored confection which when utilized as a chocolate flavored chip in ice cream, frozen cake batters and doughs, or other products that will be subjected to low temperatures will retain its softness at such low temperatures thereby imparting a desirable texture to the product.

A further purpose is to produce a chocolate flavored confection having a heterogeneous mixture of ingredients bound together in a solid composite and having a low fat and low moisture content.

A still further purpose is to produce an improved chocolate flavored confection which when utilized as a cholate flavored chip in ice cream will not only retain its softness at the low temperature of ice cream thereby imparting a desirable texture to the ice cream product, but will enhance the flavor of the product as well.

Further purposes will appear in the following specification:

The standards prescribed for cacao products by the Food and Drug Administration of the United States Government call for a given minimum amount of chocolate liquor in a product before that product may be referred to as "chocolate." In the range of compositions that constitute the disclosed invention, the amount of chocolate liquor employed sometimes falls below the prescribed minimum. The words "chocolate flavored" are therefore used throughout the specification to describe the full range of compositions of the invention and will include "chocolate" as well as "chocolate flavored" products. Similarly, the ingredients hereinafter referred to as "chocolate liquor" and "cocoa" are meant to be those defined in the aforementioned standards.

Ordinary chocolate confections presently being employed as chocolate chips in ice cream have a tendency to become brittle when exposed to the low temperature of ice cream (in the range of 0° F. to −20° F.). As a result, both the flavor and smoothness of ordinary chocolate chip ice cream becomes impaired.

The reason for the brittleness and resulting poor flavor and texture characteristics of ordinary chocolate confections at low temperatures is found in the physical structure of the compositions presently in use. These compositions contain sufficient fat to form a continuous fat matrix in which the chocolate, sugar and other flavoring ingredients are held. At the low temperature of ice cream, the fat becomes brittle and, in effect, surrounds the flavoring ingredients with a hardened shell so that their full potential for imparting flavor to the overall ice cream and chocolate mixture is not realized.

When chocolate flavored chips are employed in frozen cake batters and doughs and similar products, the handling and the cutting of the product at low temperatures is impaired by the hardness of ordinary chocolate chips.

I have found that a chocolate flavored confection having more desirable characteristics at low temperatures can be formed by maintaining a relatively low fat and moisture content and subjecting the mixture of ingredients to pressure whereby the ingredients are bound together in a solid composite having a continuous heterogeneous phase of ingredients rather than a fat matrix in which the ingredients are held. In this way, the flavoring ingredients are not surrounded by fat but are fully exposed. Such a composition will retain its softness and smoothness at low temperatures.

A primary ingredient of the invention is the chocolate flavoring which may be added as chocolate liquor or as cocoa or as a mixture of chocolate liquor and cocoa.

Where cocoa is employed without chocolate liquor a small amount of fat is used. The fat may be in the form of cocoa butter, natural fat, hydrogenated vegetable fat or the like or any combination of the above.

Another constituent is sugar which is added in the form of any edible sugar such as that known chemically as sucrose, anhydrous dextrose, dried corn syrup and the like or any combination of such sugars. Milk, preferably in the form of whole milk powder, may be added depending upon the flavor desired. Both sugar and milk are used in the invention as flavoring ingredients and the amounts of each relative to the other may be varied to meet a particular flavor requirement. In addition, these ingredients aid in binding all of the ingredients of the invention together.

The following table will illustrate three typical examples of compositions employed to form the novel chocolate flavored confection:

TABLE 1

*Percentages by weight*

| Example | A | B | C |
|---|---|---|---|
| Chocolate liquor | 4.1 | 12.5 | 28.4 |
| Cocoa | 17.2 | 12.1 | 0 |
| Powdered milk | 6.4 | 12.2 | 12 |
| Powdered cane sugar | 16.8 | 10.0 | 9.4 |
| Dextrose | 47.6 | 45.6 | 43.0 |
| Water | 7.9 | 7.6 | 7.2 |

The differences illustrated above are dictated by the flavor desired. Example A may be described as "sweetened chocolate flavored confection with milk," Example B could be designated "sweetened milk chocolate confection," and Example C would be "milk chocolate confection."

In the preferred method of manufacturing the novel chocolate flavored confection utilizing chocolate liquor and cocoa, the chocolate liquor, whole milk powder, water and ⅓ to ⅕ of the total sugar, preferably in the form of powdered cane sugar, are mixed. The resulting mixture is heated until a soft, paste-like product is formed. This will occur at or near the melting point of chocolate liquor in the range of 92° F. to 120° F. Then the cocoa and the remainder of the sugar, preferably in the form of dextrose, are mixed and added to the paste-like mixture producing a composition having a powder-like consistency. The powder-like composition is then compressed whereby a soft, smooth textured solid composite of ingredients is produced.

In those compositions wherein the chocolate flavoring is derived entirely from chocolate liquor, the same sequence of steps is followed. However, in this instance the cocoa will be omitted and only dextrose is added to the paste-like product.

In those compositions wherein the chocolate flavoring is derived entirely from cocoa, the whole milk powder, water and powdered cane sugar are mixed with fat and heated to the melting point of the fat to produce the paste-like product. Then the cocoa and dextrose mixture is added to the paste-like mixture to produce the powder-like composition.

It will be readily apparent to one skilled in the art that an alternative method consisting of merely mixing all of the ingredients together in a single step could be employed to form the novel confection. I have found that in such a method it is more difficult to thoroughly mix the ingredients and the likelihood of obtaining an inferior product is greatly increased.

An important step in the process of the invention is the compression of the powder-like composition to form the solid composite. Whereas in ordinary chocolate confections a solid is formed by the natural hardening of a mixture of melted chocolate liquor (or cocoa and fat) and other flavoring ingredients, the solid of the invention is formed by exerting pressure upon a powdery mixture of ingredients thereby compacting it. In this way the solid may be formed without the necesssity of relatively large amounts of fat or moisture to bind the ingredients together.

The compression and formation of chips subsequent to blending the ingredients as indicated has been successfully carried out through extruding the powder-like composition. The extruding pressure acts to bind the ingredients together and the resulting composite is forced through the extruding die. When the extrusion is carried out through small holes (of the size and shape of the chip desired) the resulting extrusion will readily break up into adequate sized chips.

It will be readily apparent that small chips of the composition of the invention may be formed directly from the powder-like mixture of ingredients by compacting small amounts of that mixture in a manner similar to the manufacture of tablets as well as by dividing larger masses of the solid composite.

The solid composite of the invention is composed of a heterogeneous mixture of the ingredients illustrated above. Because of the relatively low fact content, there is no formation of a continuous matrix of fat which will bind the ingredients together as in ordinary chocolate confections. The ingredients of the invention are bound together by the combination of a small amount of moisture and by compression resulting in a continuous heterogeneous mixture of ingredients in the form of a solid composite. Such a composition does not become brittle at low temperatures such as that of ice cream because of the absence of the fat matrix and the low moisture content. When the confection of the invention is utilized as chips in chocolate chip ice cream, the smoothness of the composite of the invention enhances the texture of the chocolate chip-ice cream mixture. Of even greater importance, however, is that the flavoring ingredients are not enveloped in a hardened fat matrix and their full flavor potential may be realized.

When the confection of the invention is used as chips in frozen cake batters and doughs and the like, the softness of the chips at low temperatures will not interfere with the cutting and handling of the chocolate chip-cake batter mixture at low temperatures.

While the invention has been described in detail with respect to particular preferred examples, it will be evident to those skilled in the art, after understanding the invention that further variations may be made without departing from the scope of the invention. It is intended, therefore, that the appended claims cover all such variations.

Having thus described my invention, I claim:

1. In a method of producing a chocolate flavored confection having a heterogeneous mixture of ingredients including chocolate liquor, sugar and water bound together in a solid composite especially suitable for utilization at low temperatures, the steps of mixing together said ingredients in such proportions as to limit the fat content of the mixture to less than 20 percent by weight and the moisture content to less than 8 percent by weight, heating the mixture to a temperature high enough but no higher than that required to melt the chocolate liquor so as to minimize the dissolution of the sugar while mixing to effect a heterogeneous mixture of ingredients, and compressing the mixture at a pressure great enough to bind the ingredients into said composite.

2. In a method of producing a chocolate flavored confection having a heterogeneous mixture of ingredients including cocoa, fat, sugar and water bound together in a solid composite especially suitable for utilization at low temperatures, the steps of mixing together said ingredients in such proportions as to limit the fat content of the mixture to less than 20 percent by weight and the moisture content to less than 8 percent by weight, heating the mixture to a temperature high enough but no higher than that required to melt the fat content so as to minimize the dissolution of the sugar while mixing to effect a heterogeneous mixture of ingredients, and compressing the mixture at a pressure great enough to bind the ingredients into said composite.

3. In a method of producing a chocolate flavored confection having a heterogeneous mixture of ingredients including chocolate liquor, sugar and water bound together in a solid composite especially suitable for utilization at low temperatures, the steps of mixing together a portion of the ingredients including the chocolate liquor, the water and $1/3$ to $1/5$ of the total of the sugar and heating the resulting mixture to a temperature high enough but no higher than that required to melt the chocolate liquor so as to minimize the dissolution of the sugar while mixing to form a paste-line product, further mixing with the paste-like product the remainder of the total of said sugar to form a heterogeneous mixture of ingredients, all of the ingredients being in such proportions as to limit the fat content of said heterogeneous mixture to less than 20 percent by weight and the moisture content to less than 8 percent by weight, and compressing the mixture at a pressure great enough to bind the ingredients into said composite.

4. In a method of producing a chocolate flavored confection having a heterogeneous mixture of ingredients including cocoa, fat, sugar and water bound together in a solid composite especially suitable for utilization at low temperatures, the steps of mixing together a portion of the ingredients including the fat, the water and $1/3$ to $1/5$ of the total of the sugar and heating the resulting mixture to a temperature high enough but no higher than that required to melt the fat so as to minimize the dissolution of the sugar while mixing to form a paste-like product, further mixing with the paste-like product a mixture of cocoa and the remainder of the total of the sugar to form a heterogeneous mixture of ingredients, all of the ingredients being in such proportions as to limit the fat content of said heterogeneous mixture to less than 20 percent by weight and the moisture content to less than 8 percent by weight, and compressing the mixture at a pressure great enough to bind the ingredients into said composite.

References Cited by the Examiner

UNITED STATES PATENTS

| 2,384,077 | 9/45 | Crosley et al. | 99—23 |
| 2,487,931 | 11/49 | Lataner | 99—23 |
| 2,969,285 | 1/61 | Cook | 99—23 |

A. LOUIS MONACELL, *Primary Examiner.*

ABRAHAM H. WINKELSTEIN, B. H. STRIZAK, *Examiners.*